United States Patent
Araki et al.

(10) Patent No.: US 7,174,458 B2
(45) Date of Patent: Feb. 6, 2007

(54) METHOD OF AND APPARATUS FOR AUTHENTICATING CLIENT TERMINAL BY MAKING USE OF PORT ACCESS

(75) Inventors: Motohisa Araki, Ome (JP); Toshio Murai, Ichikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 782 days.

(21) Appl. No.: 10/218,618

(22) Filed: Aug. 15, 2002

(65) Prior Publication Data

US 2003/0056097 A1 Mar. 20, 2003

(30) Foreign Application Priority Data

Sep. 14, 2001 (JP) .............................. 2001-280783

(51) Int. Cl.
*H04L 9/00* (2006.01)
(52) U.S. Cl. ..................................... 713/168; 713/150
(58) Field of Classification Search .............. 713/168; 726/27

See application file for complete search history.

(56) References Cited

U.S. PATENT DOCUMENTS

| 6,021,495 | A  | * | 2/2000 | Jain et al. ...................... 726/16 |
| 6,237,023 | B1 | * | 5/2001 | Yoshimoto .................. 709/203 |
| 6,282,575 | B1 | * | 8/2001 | Lin et al. ..................... 709/244 |
| 2002/0049655 | A1 | * | 4/2002 | Bennett et al. ................ 705/35 |

* cited by examiner

*Primary Examiner*—Nasser Moazzami
*Assistant Examiner*—Pramila Parthasarathy
(74) *Attorney, Agent, or Firm*—Finnegan, Henderson, Farabow, Garrett & Dunner, L.L.P.

(57) ABSTRACT

Each time one of a predetermined n number of authentication ports is accessed by a client terminal, a server checks to see if all of the n number of authentication ports have been accessed. If all of the n number of authentication ports have been accessed, the server determines that it has succeeded in authenticating the client terminal, opens its communications port to the terminal, and gives right of access to the client terminal.

14 Claims, 13 Drawing Sheets

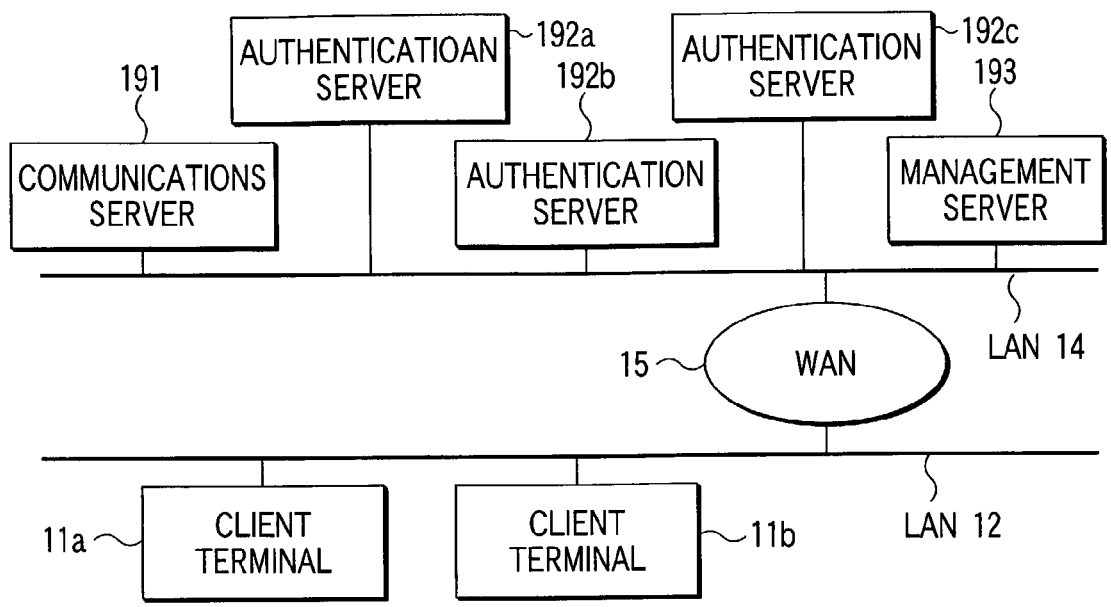
F I G. 19
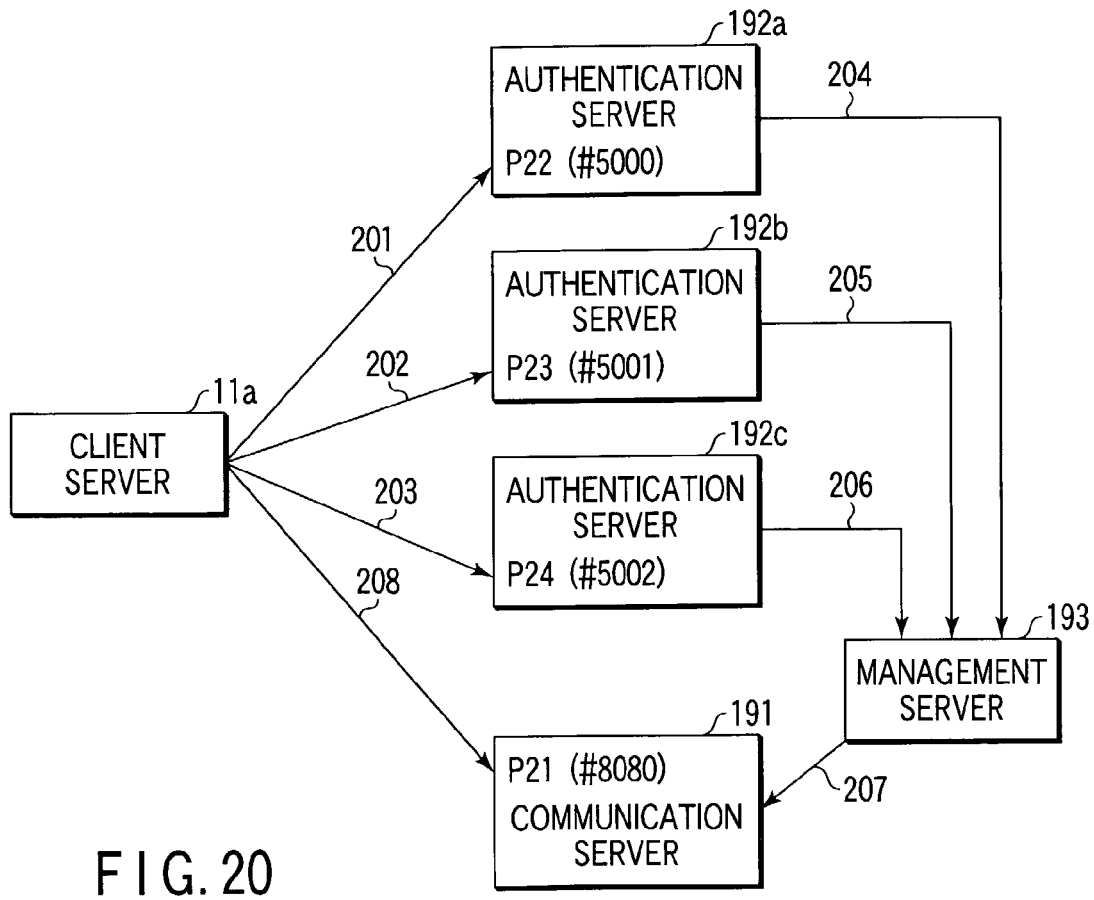
F I G. 20

METHOD OF AND APPARATUS FOR AUTHENTICATING CLIENT TERMINAL BY MAKING USE OF PORT ACCESS

CROSS-REFERENCE TO RELATED APPLICATIONS

This application is based upon and claims the benefit of priority from the prior Japanese Patent Application No. 2001-280783, filed Sep. 14, 2001, the entire contents of which are incorporated herein by reference.

BACKGROUND OF THE INVENTION

1. Field of the Invention

This invention relates to a communications system which has a server that has a plurality of ports, and more particularly to a method of and an apparatus for authenticating a client terminal by making use of port access to the server from the client terminal.

2. Description of the Related Art

For a client terminal, such as a personal computer (PC), to access a server, the following procedure is generally required. First, a client terminal accesses, among the ports that the server has, the port with a port number predetermined for communication use (or communications port). Then, the server requests the client terminal to input a password and other information and authenticates the terminal. After passing the authentication and getting a right of access, the client terminal can access various resources the server has.

As described above, it is a common practice to predetermine the port number for a port (communications port) for a client terminal to communicate with the server. For this reason, once an unauthorized server user, or a third party, knowns the predetermined communications port, he or she can access the port. In that case, since the accessing person is generally identified by a subsequent password authentication, the third party that does not know the password fails to pass authentication. In this case, with the client terminal, the third party cannot use various resources the server has. That is, access by the unauthorized server user, or the third party, to the server is limited by the password authentication even when the third party knows the port number of the communications port.

In the case of an ill-intentioned third party, he or she can access the communications port by means of the client terminal and, for example, send a large number of passwords mechanically by program processing, and thereby succeed in passing password authentication. In this case, there is a risk that the malicious third party will use freely the resources and other services the server has.

BRIEF SUMMARY OF THE INVENTION

It is accordingly an object of the present invention to provide a method of and an apparatus for preventing a server from being accessed illegally by authenticating a client terminal on the basis of port access to the server from the client terminal.

According to an aspect of the present invention, there is provided a method of authenticating a client terminal by making use of port access to a server from the client terminal in a communications system comprising server that includes a port allocated as a communications port and a plurality of ports allocated as authentication ports. The method comprises monitoring, detecting, and opening. The act of monitoring is to monitor the accessing of the client terminal to any one of the plurality of authentication ports. The act of detecting is to detect on the basis of the result of the monitoring of the accessing that all of the plurality of authentication ports have been accessed by the client terminal. The act of opening is to, when it is detected that all of the plurality of authentication ports have been accessed by the client terminal, open the communications port to the client terminal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 16 is a diagram to help explain the operation when the client terminal 11a is authenticated by an authentication server 152 and accesses a communications server 151a;

FIG. 19 shows the configuration of a communications system according to a third embodiment of the present invention; and FIG. 20 is a diagram to help explain the operation when the client terminal 11a is authenticated by authentication servers 192a to 192c and further authenticated comprehensively by a management server 193 and then accesses a communications server 191 in the third embodiment.

DETAILED DESCRIPTION OF THE INVENTION

Hereinafter, referring to the accompanying drawings, embodiments of the present invention will be explained.

[First Embodiment]

Figure 1:
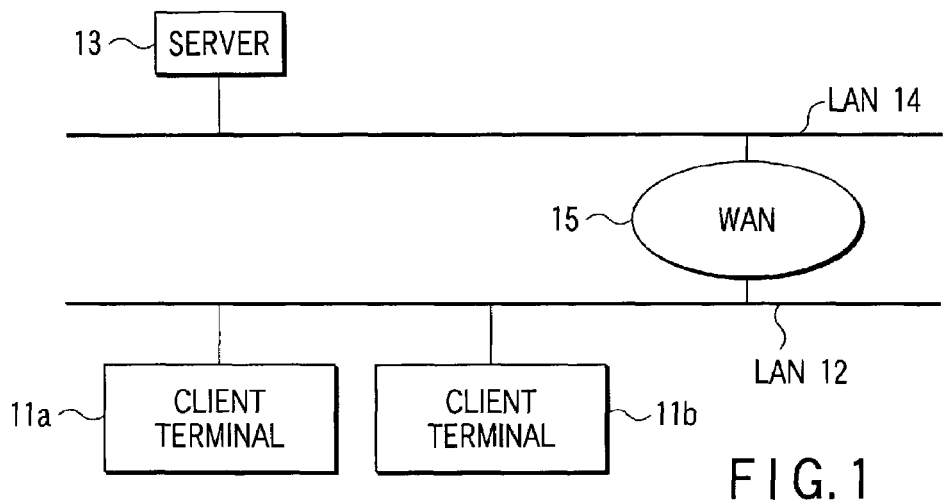
FIG. 1 shows the configuration of a communications system according to a first embodiment of the present invention.

FIG. 1 shows the configuration of a communications system according to a first embodiment of the present invention. The communications system is a client server system. In FIG. 1, client terminals 11a and 11b are connected to a network, such as a LAN (local area network) 12. A server (or server computer) 13 is connected to a LAN 14. The LAN 12 and LAN 14 are connected to each other via a WAN (wide area network) 15, such as the Internet. That is, the client terminal 11a, client terminal 11b, and server 13 are connected to one another via the network.

Figure 2:
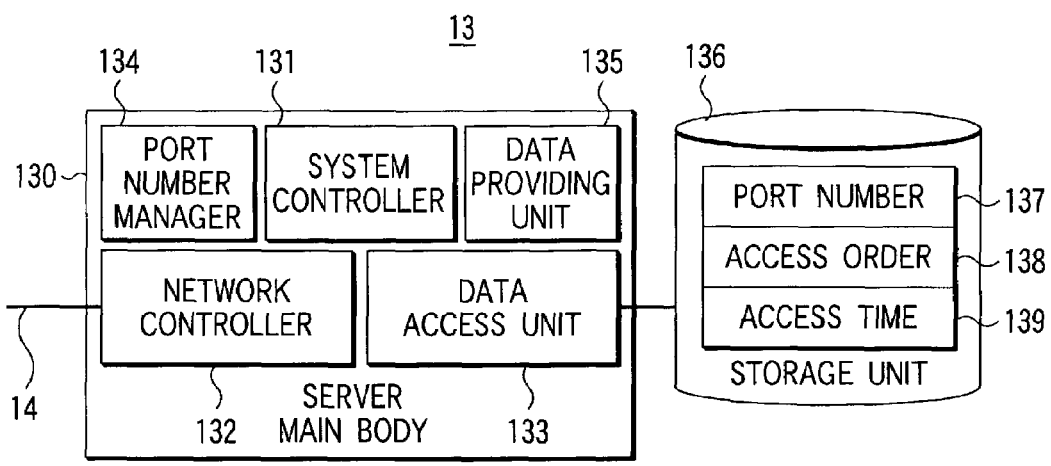
FIG. 2 is a block diagram showing the configuration of the server 13 in FIG. 1.

As shown in FIG. 2, the server 13 is composed of a server main body 130 and a storage unit 136. The storage unit 136 is an external memory unit, such as a hard disk drive. The server main body 130 includes a system controller 131, a network controller 132, a data access unit 133, a port number manager 134, and a data providing unit 135. The system controller 131 is the main controller of the server 13. The network controller 132, which is connected to the LAN 14, controls communication with the LAN 14. The data access unit 133 reads data from the storage unit 136 and writes data to the storage unit 136. The port number manager 134 manages the port numbers of a plurality of ports the server 13 has. These ports, which are, for example, logical ports, are used for the client terminals 11a and 11b or the like to access the server 13 via the LAN 14. The data providing unit 135 provides the party requesting the data with the data read by the data access unit 133 from the storage unit 136.

Figure 3:
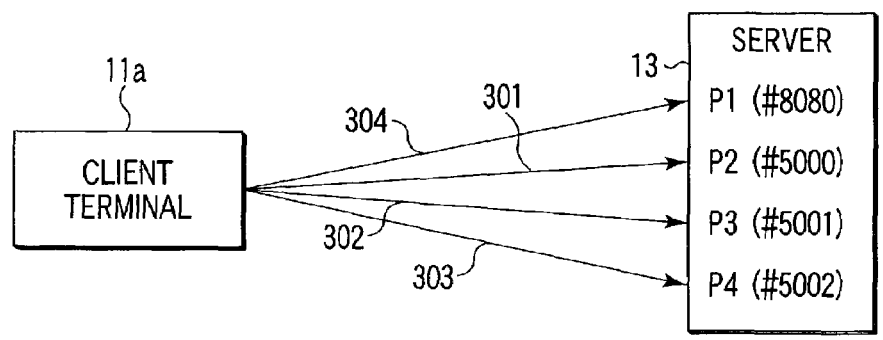
FIG. 3 is a diagram to help explain the operation when the client terminal 11a is authenticated by the server 13 and accesses the server 13 in the first embodiment.

As shown in FIG. 3, the group of port numbers managed by the port number manager 134 includes the port number 8080 of port P1 and the port numbers 5000, 5001, and 5002 of ports P2, P3, and P4, respectively. Port 1 is allocated as a communications port used between the client terminals 11a, 11b, and others and the server 13. The fact that port P1 is a communications port and its port number is 8080 is open to the public. Port P1 is normally closed by the port number manager 134. On the other hand, port numbers P2, P3, and P4 are allocated as authentication ports. The fact that ports P2, P3, and P4 are authentication ports and their port numbers are 5000, 5001, and 5002, respectively, is kept secret from a third party.

The port number manager 134 of the server 13 has an authenticating function of authenticating (the user of) the client terminal as authorized when all of ports P2 to P4 are accessed by the client terminal, that is, an authenticating function making use of port access. The port number manager 134 also has the function of, when authenticating the client terminal as authorized, opening port P1 and giving the client terminal a right of access. The function of the port number manager 134 is assumed to be realized by the server 13 reading a specific program recorded on a computer-readable recording medium or downloaded via a communications medium, such as a network, and executing the program.

The client terminals 11a and 11b have the function of, when needing to access the server 13 via communications port P1, obtaining authentication by accessing all of authentication ports P2 to P4 and accessing the server 13 through communications port P1. This function is assumed to be realized by the client terminals 11a and 11b reading a specific program recorded on a computer-readable recording medium or downloaded via a communications medium, such as a network, and executing the program.

In the storage unit 136 of FIG. 2, an authentication port number area 137 for storing the port number of a port allocated as an authentication port is secured. In the area 137, the port numbers 5000 to 5002 of ports P2 to P4 are stored. In the storage unit 136, an access order area 138 is also secured when a first modification of the embodiment is applied. The area 138 is used to store information that indicates the predetermined order in which the authentication ports are accessed. In the storage unit 136, an access time area 139 is also secured when a second modification of the embodiment is applied. The area 139 is used to store information that indicates a predetermined access time. The access time is an allowed access time for a client terminal to access all of the authentication ports.

Figure 4:
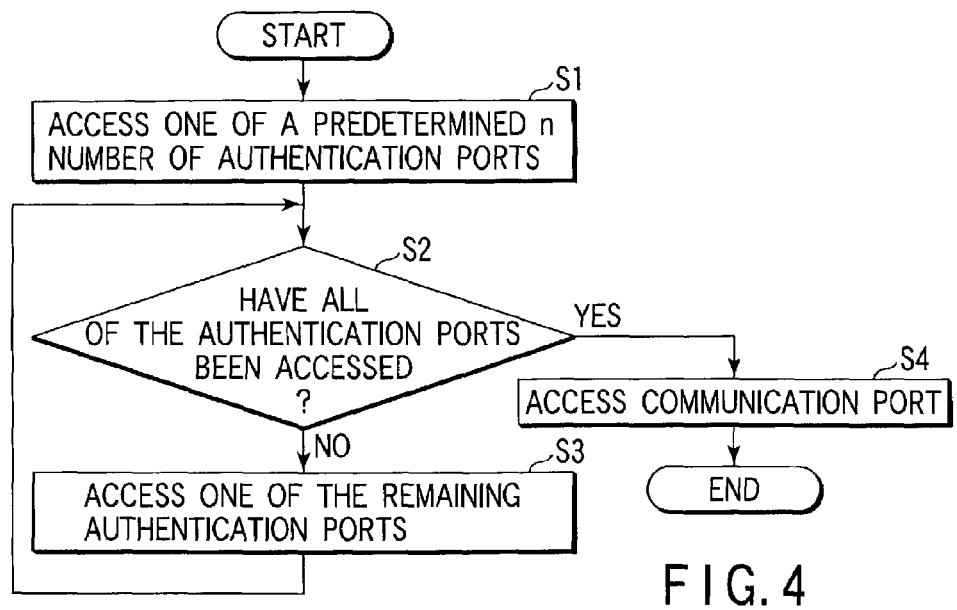
FIG. 4 is a flowchart to help explain the procedure for the processing by the client terminal 11a in the first embodiment.
Figure 5:
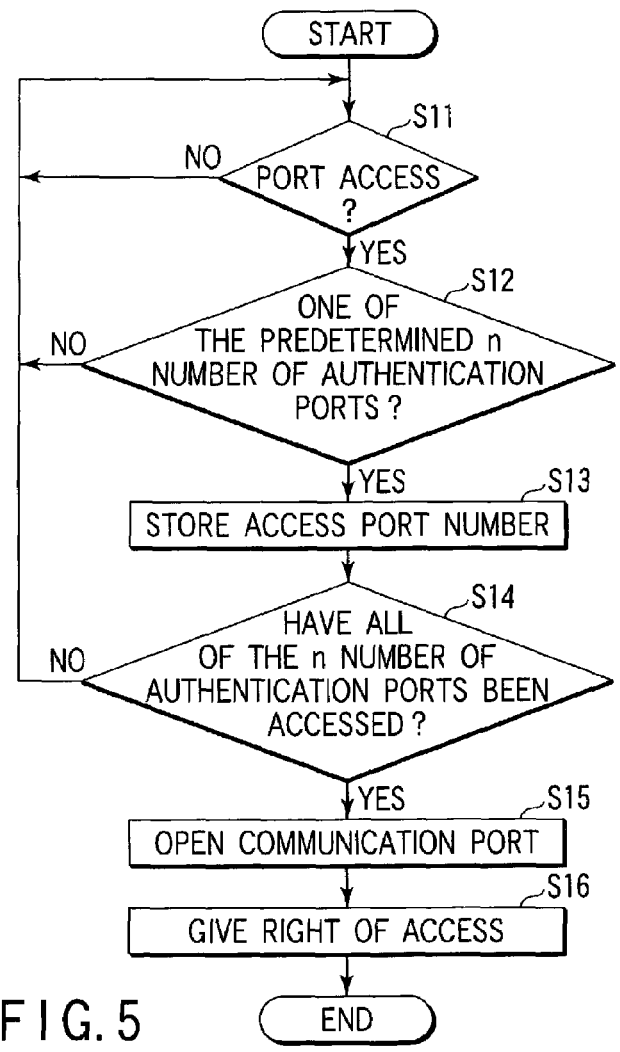
FIG. 5 is a flowchart to help explain the procedure for the processing by the server 13 in the first embodiment.

Next, referring to an explanatory diagram for operation in FIG. 3 and the flowcharts of FIGS. 4 and 5, the operation of the first embodiment will be explained, using a case where the client terminal 11a accesses the server 13. FIG. 4 is a flowchart to help explain the procedure for the processing by the client terminal 11a. FIG. 5 is a flowchart to help explain the procedure for the processing by the server 13.

First, it is assumed that the port numbers for an n number of authentication ports used in authentication at the server 13, for example, the port numbers 5000 to 5002 of three ports P2 to P4 have been determined. Information about the port numbers 5000 to 5002 of ports P2 to P4 has been stored in the authentication port number area 137 in the storage unit 136 of the server 13. It is assumed that the port numbers 5000 to 5002 of authentication ports P2 to P4 have been notified to (the authorized user of) the client terminal 11a in such a manner that they are kept secret from a third party. The notice is not necessarily given via a network and may be given by mail or by telephone. In this case, the user of the client terminal 11a has only to operate the client terminal 11a to set the port numbers 5000 to 5002 of authentication ports P2 to P4. In the first embodiment, it is assumed that the port numbers (the port numbers 5000 to 5002 of ports P2 to P4) of the same authentication ports as those in the client terminal 11a have been set in the client terminal 11b. The port numbers of an n number of authentication ports may be set in such a manner that they are unique to each client terminal or each user thereof. It is not necessary that the value of n should be the same for each client terminal or for each user. In this case, information about the port numbers of an n number of ports allocated as authentication ports has only to be stored for each client terminal or for each user of client terminals.

Suppose the terminal 11a accesses the server 13 at the request of the user of the terminal 11a. In this case, the terminal 11a accesses one of the n number of authentication ports of the server 13, whose number has been notified (step S1). At this time, communications port P1 is closed differently from a conventional equivalent. When the port is accessed by the client terminal 11a with the port P1 being closed (step S11), the port number manager 134 in the server 13 executes the next determining step S12. That is, the port number manager 134 determines whether the accessed port is one of the n number of authentication ports indicated by the port number stored in the authentication port number area 137 of the storage unit 136 (step S12). At the request of the port number manager 134, the data access unit 133 reads information about the port numbers of the n number of authentication ports stored in the area 137. The data providing section 135 then supplies the information to the manager 134.

If the port number manager 134 has determined in step S12 that the port accessed by the terminal 11a is not one of the n number of authentication ports, it waits for the next port access from the terminal 11a (step S11). In contrast, if the accessed port is one of the n number of authentication ports, the manager 134 stores the port number of the accessed authentication port temporarily (step S13). Then, from the port numbers of all of the authentication ports stored at that time, the manager 134 determines whether all of the n number of authentication ports have been accessed (step S14). If there is any unaccessed authentication port left, the manager 134 waits for the next port access (step S11).

After the client terminal 11a accesses one of the n number of authentication ports (step S1), it determines whether it has accessed all of the authentication ports (step S2). If there is any unaccessed port left, the client terminal 11a accesses one of the remaining unaccessed authentication ports (step S3).

On the other hand, if the client terminal 11a has accessed all of the n number of authentication ports (step S14), the port number manager 134 in the server 13 determines that (the user of) the client terminal 11a is (the user of) an authorized client terminal. In this case, the manager 134 considers that it has succeeded in authenticating the client terminal 11a and opens the communications port P1 closed until then to the client terminal 11a (step S15). Then, the manager 134 gives a right of access to (the user of) the client terminal 11a (step S16). As a result, the client terminal 11a, which has finished accessing all of the n authentication ports (in this case, authentication ports P2 to P4), accesses the server 13 via the communications port P1 of the server 13 and uses various resources the server has 13 (step S4).

Accordingly, in the first embodiment where the n number of authentication ports are three ports P2 to P4 with the port numbers 5000 to 5002, when (the user of) the client terminal 11a is authorized, the client terminal 11a accesses the port of the server 13 as shown in FIG. 3. That is, port access 301 to port P2 with the port number 5000, port access 302 to the port P3 with the port number 5001, and port access 303 to port P4 with the port number 5002 are performed in that order. The port numbers of the authentication ports P2 to P4 are necessarily consecutive. The order in which authentication ports P2 to P4 are accessed is not necessarily limited to this order: P2→P3→P4, that is, port access 301→port access 302→port access 303. The number of authentication ports is not necessarily limited to 3. That is, the port numbers of the n number of authentication ports have only to be determined in advance and notified to the client terminal 11a in such a manner that it is kept secret from a third party.

When the client terminal 11a performs port accesses 301 to 303 to authentication ports P2 to P4 with the port numbers 5000 to 5002 as in the example of FIG. 3, (the port number manager 134 in) the server 13 opens the presently closed actual communications port P1, that is, communications port P1 whose port number 8080 is open to the public. Then, the server 13 gives a right of access to the client terminal 11a. This enables the client terminal 11a to perform access 304 to the server 13 via the opened communications port P1 and thereby use various resources of the server 13.

In the first embodiment, the communications port P1 is closed in the normal state as described above. Therefore, even if a third party that has no idea that ports P2 to P4 are authentication ports and their port numbers are 5000 to 5002 tries to access the communications port P1 with the port number 8080, attempting to use resources of the server 13, the third party cannot access the server 13. That is, with the first embodiment, authentication making use of access to authentication ports (P2 to P4) prevents the third party from accessing the server 13 illegally, which improves the security of the server 13. The number of authentication ports may be one (that is, n=1). As compared with use of a plurality of authentication ports, use of a single authentication port is low in the improvement of the security of the server. It is clear that the larger the number of authentication ports, the more the security of the server 13 improves.

As described above, authentication making use of access to ports in the first embodiment improves the security of the server as compared with conventional authentication using passwords. Use of the following modifications 1 to 6 of the first embodiment enables the security of the server to be improved further.

[First Modification]

Figure 6:
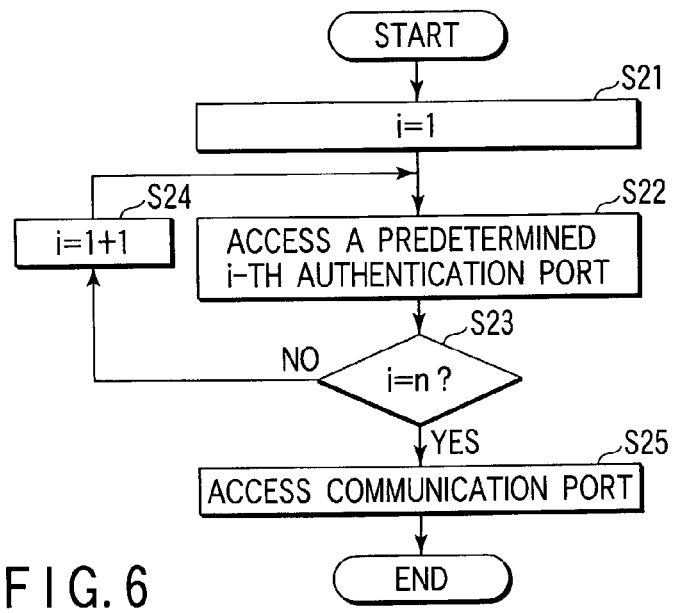
FIG. 6 is a flowchart to help explain the procedure for the processing by the client terminal 11a in a first modification of the first embodiment.
Figure 7:
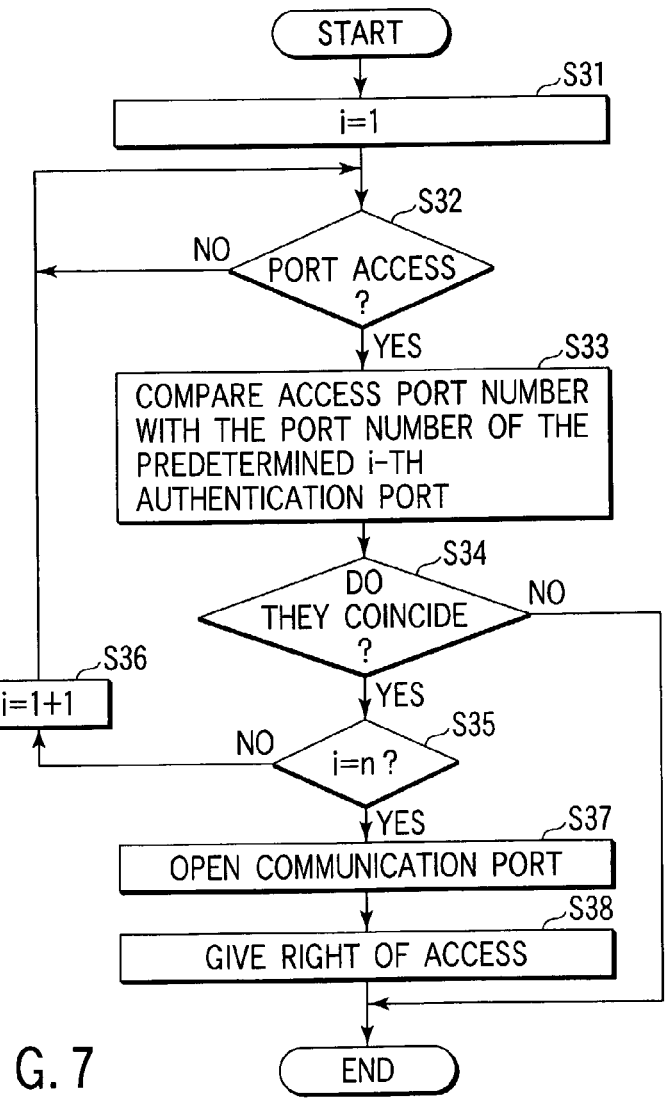
FIG. 7 is a flowchart to help explain the procedure for the processing by the server 13 in the first modification.

A first modification of the first embodiment will be explained by reference to flowcharts in FIGS. 6 and 7. FIG. 6 is a flowchart to help explain the procedure for the processing by the client terminal 11a. FIG. 7 is a flowchart to help explain the procedure for the processing by the server 13.

The first modification is characterized in that not only the port numbers for an n number of authentication ports but also the order in which the n number of authentication ports are accessed are determined in advance. Information about the order of access is previously stored in the access order area 138 in the storage unit 136 of the server 13. Like the port numbers of the n number of authentication ports, the information about the order of access is previously notified to (the authorized user of) the client terminal 11a in such a manner that it is kept secret from a third party. In the modification, it is assumed that the port numbers 5000 to 5002 of three ports P2 to P4 have been notified (or set) as the port numbers for authentication ports and that the order of port P2 with the port number 5000→port P3 with the port number 5001→port P4 with the port number 5002 has been notified (or set) as the order of access.

When the client terminal 11a needs to access the server 13, the terminal 11a accesses the server 13 in such a manner that the terminal 11a accesses the predetermined authentication ports in the predetermined order of access (steps S21 to S24). In the modification, the terminal 11a accesses the first authentication port P2 to the n-th (third) authentication port P4 in sequence (steps S21 to S24).

On the other hand, (the port number manager 134 in) the server 13 determines that it has succeeded in authentication, only when the client terminal 11a executes port access and the order of the port access coincides with the order indicated by the access order information stored in the access order area 138 of the storage unit (steps S31 to S36). In the modification, the server 13 determines that it has succeeded in authentication, only when the terminal 11a accesses the ports in this order: port P2 with the port number 5000→port P3 with the port number 5001→port P4 with the port number 5002 (steps S31 to S36). In this case, the server 13 opens communications port P1 and gives a right of access to the terminal 11a (steps S37, S38). This enables the terminal 11a to access the server 13 via communications port P1 (step S25). In contrast, even when all of the authentication ports P2 to P4 have been accessed, if the order of access is other than P2→P3→P4, the server 13 determines that it fails in authentication and does not open communications port P1.

As described above, in the first modification of the first embodiment, the security of the server 13 can be improved further by preventing the communications port from being opened unless the n number of authentication ports are accessed in a predetermined order when they are accessed.

[Second Modification]

Figure 8:
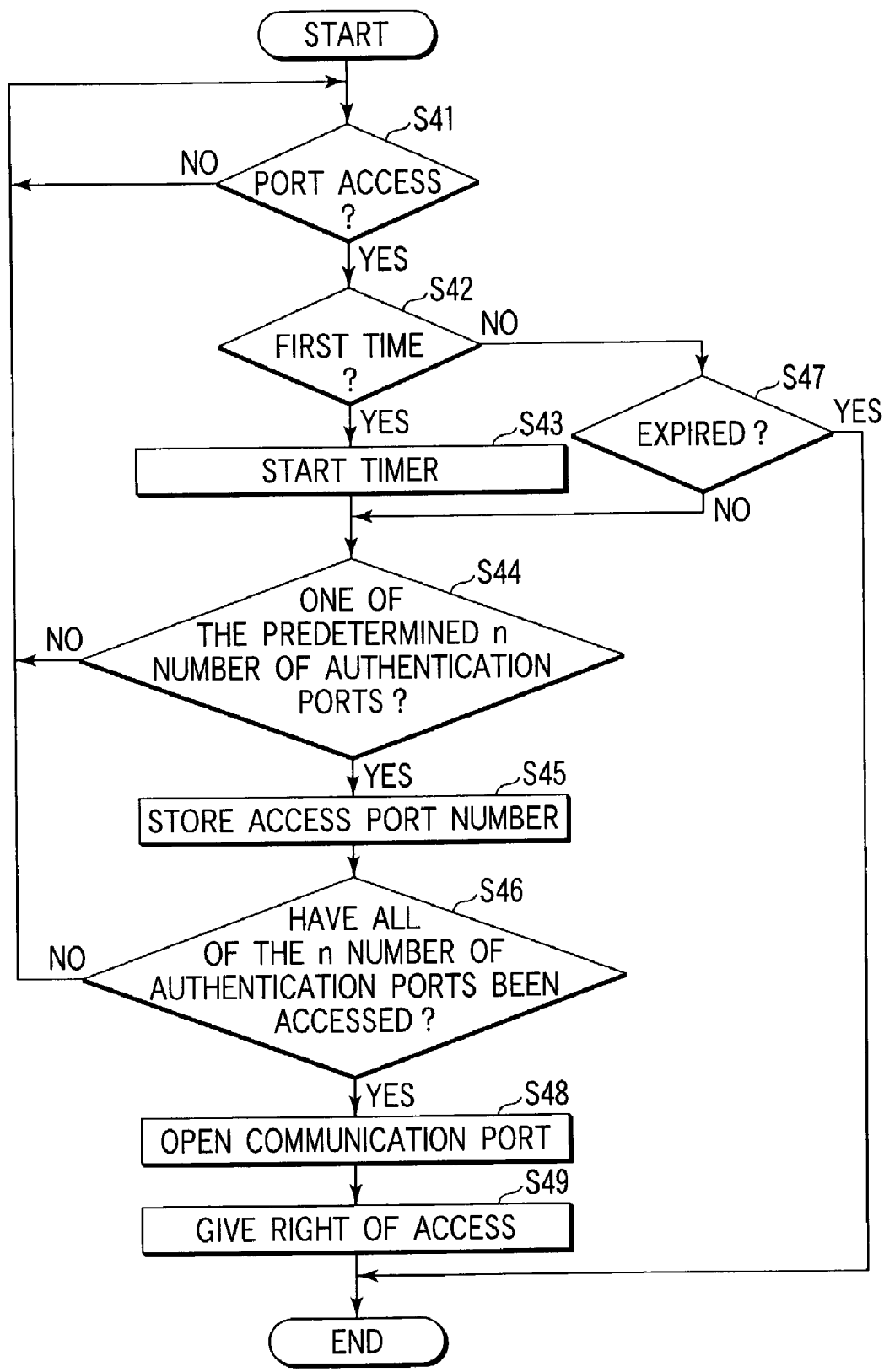
FIG. 8 is a flowchart to help explain the procedure for the processing by the server 13 in a second modification of the first embodiment.

Next, a second modification of the first embodiment will be explained by reference to a flowchart in FIG. 8. FIG. 8 is a flowchart to help explain the procedure for the processing by the server 13.

The second modification is characterized in that not only the port numbers of the n number of authentication ports but also the upper limit of the time (access time) required to access all of the n number of authentication ports are previously determined. Information about the upper limit of the access time, that is, the allowable access time, is previously stored in the access time area 139 of the storage unit 136 the server 13 has. The information about the access time is notified to (the authorized user of) the client terminal 11a in such a manner that it is kept secret from a third party. In this modification, it is assumed that the port numbers 5000 to 5002 of three ports P2 to P4 are notified (or set) as the port numbers for authentication ports and that information about the access time is also notified (or set).

When the client terminal 11a needs to access the server 13, the terminal 11a executes access to a predetermined authentication port of the server 13 so as to finish the access within a predetermined access time. In the modification, the terminal 11a performs access to port P2 with the port number 5000, access to port P3 with the port number 5001, and access to port P4 with the port number 5002 in such a manner that the time required to access the first authentication port to the last authentication port lies within the predetermined access time.

When the client terminal 11a performs a first authentication port access, (the port number manager 134) of the server 13 starts a timer that counts the predetermined access time (steps S41 to S43). If an n (=3) number of authentication ports, that is, all of the authentication ports P2 to P4 have been accessed (step S46) without the expiration of the predetermined access time (step S47), the server 13 determines that it has succeeded in authentication. In this case, the server 13 opens the communications port P1 and gives a right of access to the terminal 11a (steps S48, S49). In contrast, if the predetermined access time has expired before all of the authentication ports have been accessed (step S47), that is, if all of the authentication ports have not been accessed within the predetermined access time, the server 13 determines that it has failed in authentication and does not open communications port P1.

In the second modification of the first embodiment, the security of the server 13 can be improved much more by preventing the communications port from being opened unless all of the n number of authentication ports are accessed within the predetermined access time when they are accessed.

[Third Modification]

Figure 9:
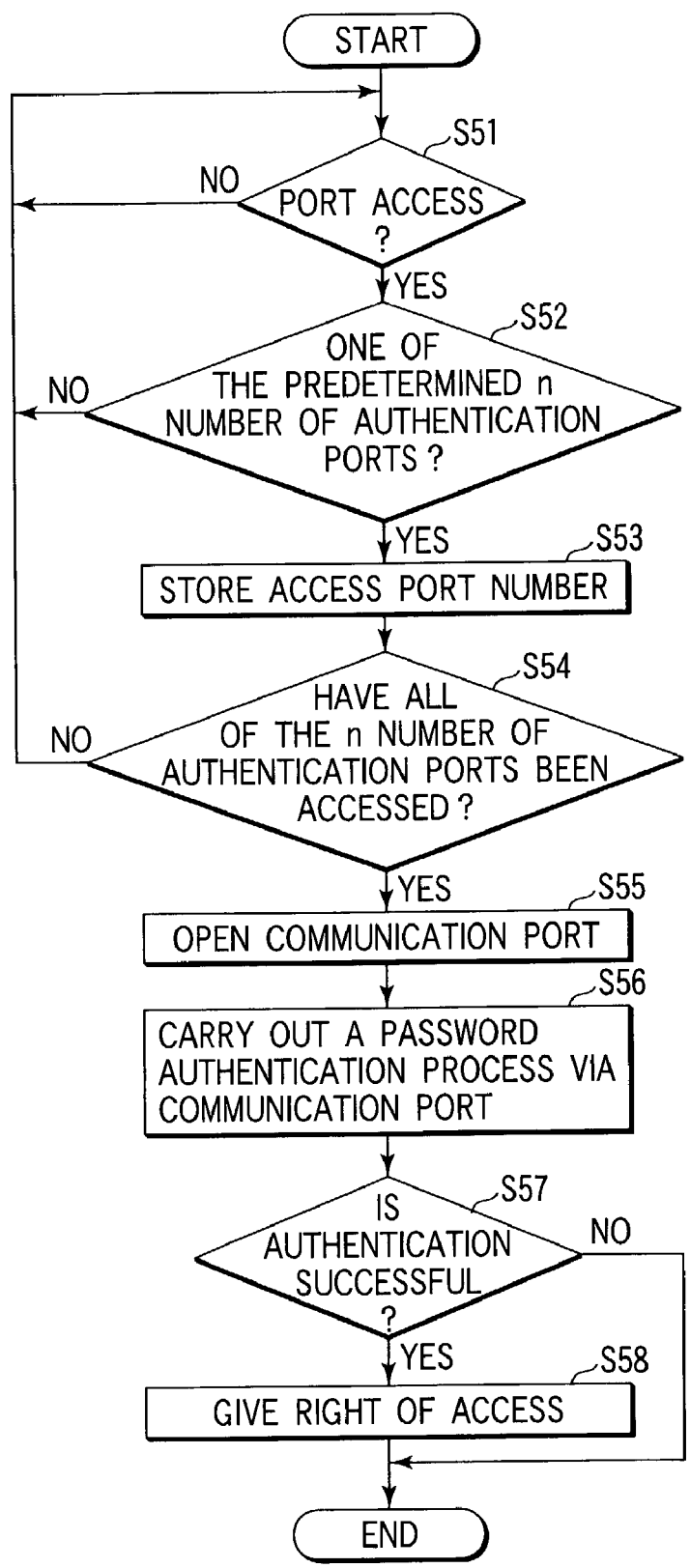
FIG. 9 is a flowchart to help explain the procedure for the processing by the server 13 in a third modification of the first embodiment.

Next, a third modification of the first embodiment will be explained by reference to a flowchart in FIG. 9. FIG. 9 is a flowchart to help explain the procedure for the processing by the server 13.

The third modification is characterized in that, when the communications port is opened as a result of authenticating a client terminal on the basis of access to the authentication port, normal password authentication is carried out and, on the basis of the result of the password authentication, a right of access is given to the party accessing the port.

In the third modification, when the client terminal 11a accesses all of a predetermined n (=3) number of authentication ports, for example, all of authentication port P2 with the port number 5000 to authentication port P4 with the port number 5002 (steps S51 to S54), (the port number manager 134 in) the server 134 opens the communications port P1 (step S55). Then, the server 13 causes the user of the terminal 11a to input a password from the client terminal 11a via the opened communications port P1, thereby carrying out a known password authenticating process (step S56). The server 13 gives a right of access to the client terminal 11a only when succeeding in authenticating the password (steps S57, S58).

As described above, in the third modification of the first embodiment, the security of the server 13 can be improved much more by authenticating the password via the communications port opened as a result of all of the predetermined n number of authentication ports having been accessed.

[Fourth Modification]

Figure 10:
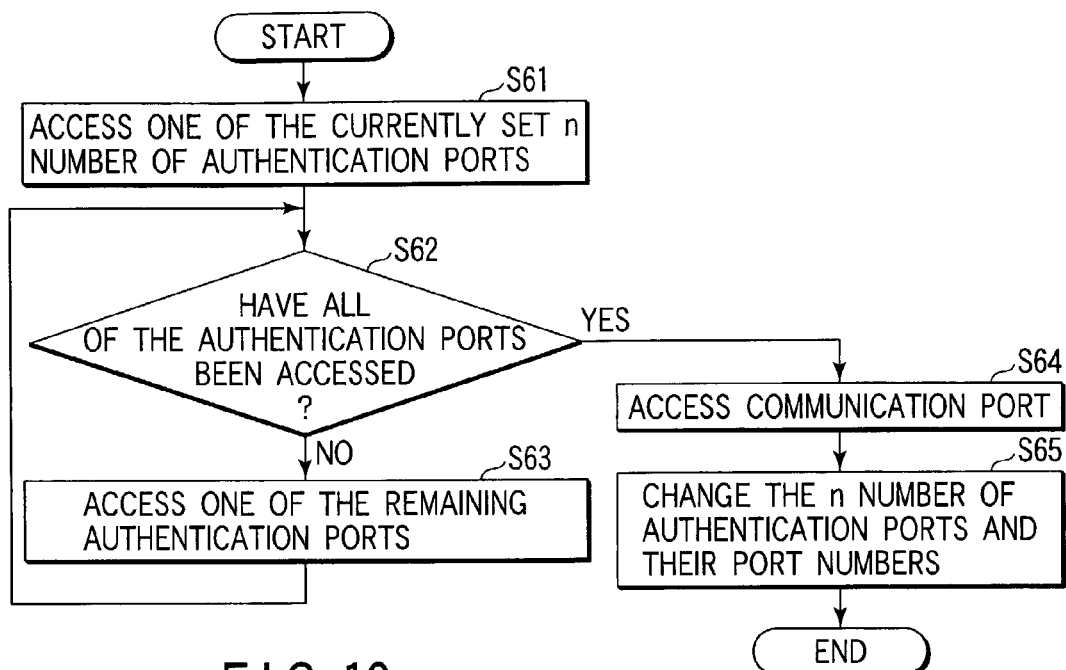
FIG. 10 is a flowchart to help explain the procedure for the processing by the client terminal 11a in a fourth modification of the first embodiment.
Figure 11:
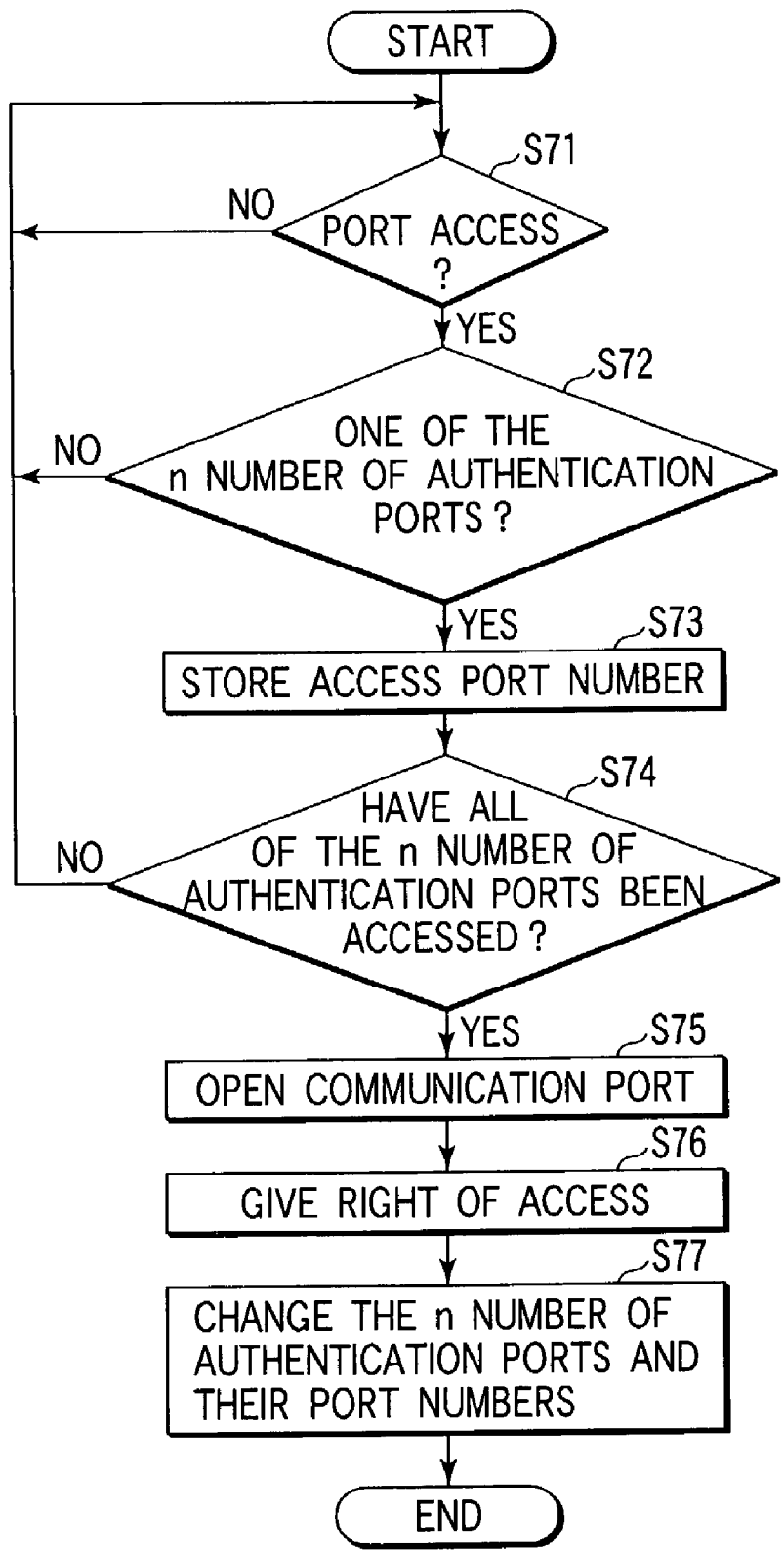
FIG. 11 is a flowchart to help explain the procedure for the processing by the server 13 in the fourth modification.

Next, a fourth modification of the first embodiment will be explained by reference to flowcharts in FIGS. 10 and 11. FIG. 10 is a flowchart to help explain the procedure for the processing by the client terminal 11a. FIG. 11 is a flowchart to help explain the procedure for the processing by the server 13.

The fourth modification is characterized in that the server 13 and the client terminal 11a change the number of authentication ports and the port numbers in synchronization with each other each time the communications port is accessed.

First, (the port number manager 134 in) the server 13 carries out a port authenticating process of the client terminal 11a by the same processes (steps S71 to S74) as in steps S11 to S14 of FIG. 5. If the server 13 has determined as a result of the port authenticating process that it has succeeded in authentication, it opens the communications port P1 and gives a right of access to the terminal 11a (steps S75 and S76). The server 13 then changes the number of authentication ports and their port numbers using a specific algorithm (step S77).

On the other hand, when the client terminal 11a is given a right of access by the server 13 as a result of accessing a predetermined n number of authentication ports by the same processes (steps S61 to S63) as those in steps S1 to S3 of FIG. 4, the terminal 11a first accesses the communications port P1 (step S64). Then, the terminal 11a changes the number of authentication ports and their port numbers to the same ones as those in the server 13 by a specific algorithm in synchronization with the changing process in step S77 by the server (step S65). For the server 13 and the client terminal 11a to change the number of authentication ports and their port numbers in synchronization with each other, for example, one-time-password techniques may be used. Alternatively, only the port numbers may be changed.

As described above, in the fourth modification, the security of the server 13 can be improved much more by changing the number of authentication ports and their port numbers each time the communications port is accessed in such a manner that the server 13 and the client terminal 11a are in synchronization with each other.

[Fifth Modification]

Figure 12:
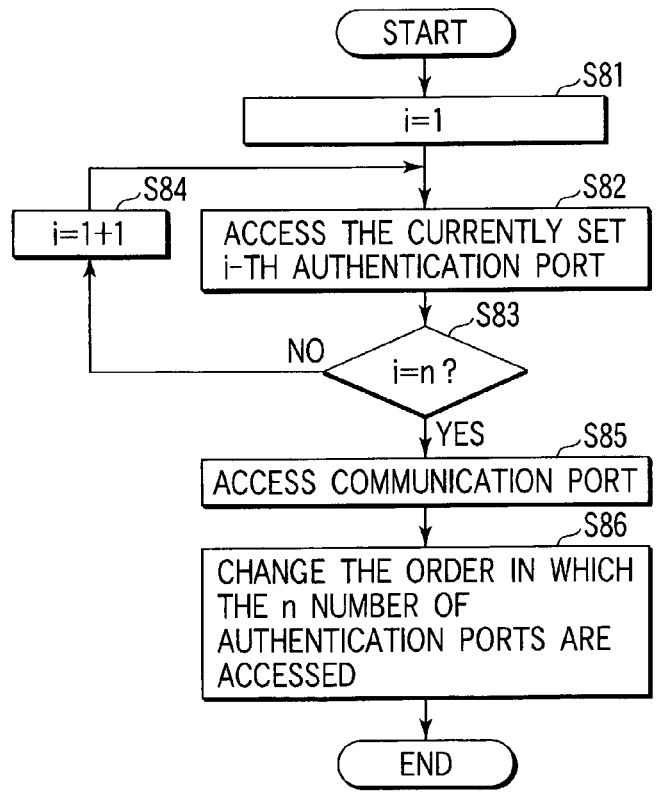
FIG. 12 is a flowchart to help explain the procedure for the processing by the client terminal 11a in a fifth modification of the first embodiment.
Figure 13:
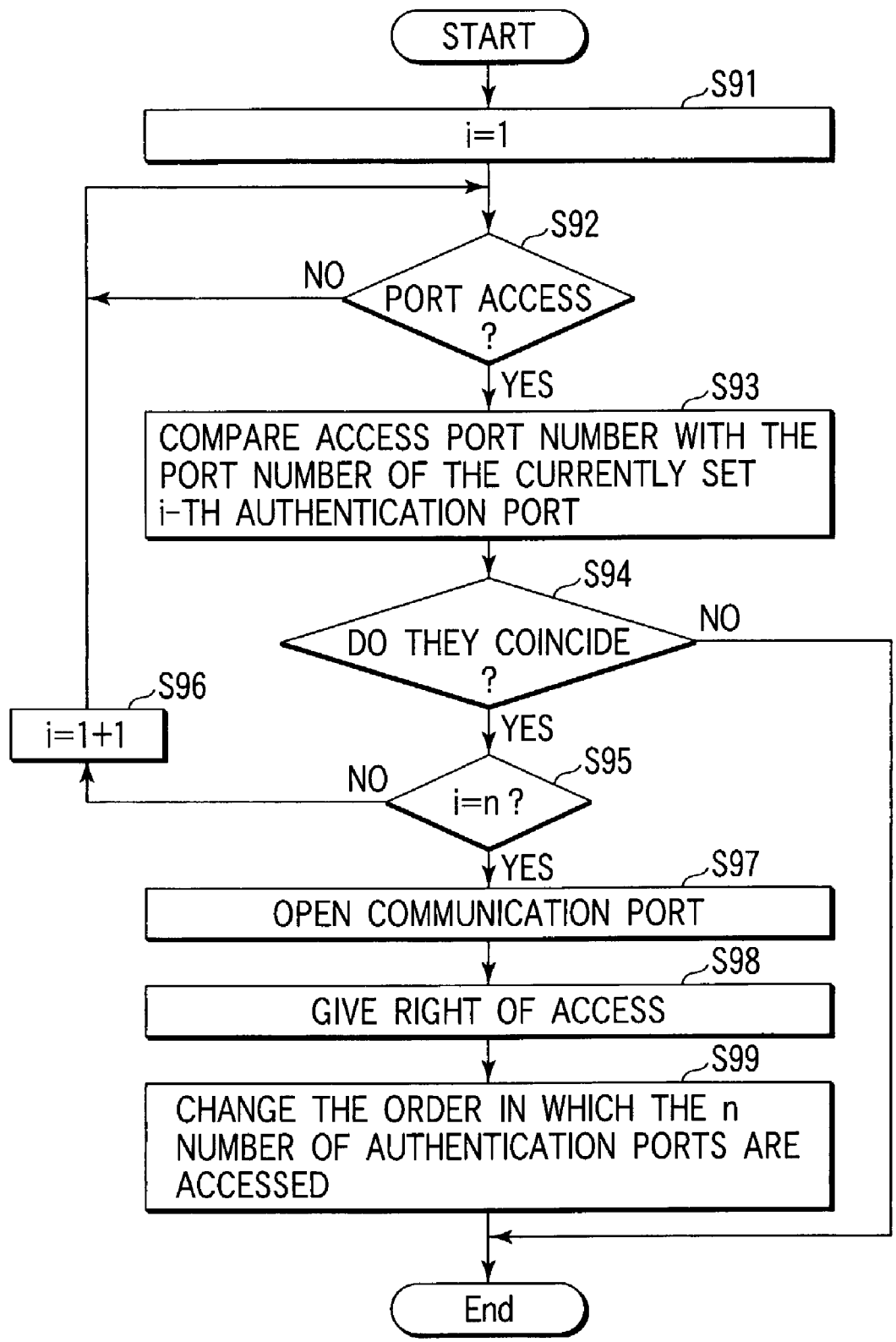
FIG. 13 is a flowchart to help explain the procedure for the processing by the server 13 in the fifth modification.

Next, a fifth modification of the first embodiment will be explained by reference to flowcharts in FIGS. 12 and 13. FIG. 12 is a flowchart to help explain the procedure for the processing by the client terminal 11a. FIG. 13 is a flowchart to help explain the procedure for the processing by the server 13.

The fifth modification is characterized in that the server 13 and the client terminal 11a change the order in which an n number of authentication ports are accessed, in synchronization with each other each time the communications port is accessed.

First, (the port number manager 134 in) the server 13 carries out a port authenticating process of the client terminal 11a by the same processes (steps S91 to S96) as in steps S31 to S36 of FIG. 7. If the server 13 has determined as a result of the port authenticating process that it has succeeded in authentication, it opens communications port P1 and gives a right of access to the terminal 11a (steps S97 and S78). The server 13 then changes the order in which the n number of authentication ports are accessed by using a specific algorithm (step S99).

On the other hand, when the client terminal 11a is given a right of access by the server 13 as a result of accessing a predetermined n number of authentication ports in a predetermined order by the same processes (steps S81 to S84) as those in steps S21 to S24 of FIG. 6, the terminal 11a first accesses the communications port P1 of the server 13 (step S85). Then, the terminal 11a changes the order in which the n number of authentication ports are accessed to the same order as that in the server 13 by a specific algorithm in synchronization with the changing process in step S99 by the server 13 (step S86). For the server 13 and the client terminal 11a to change the order of access to the n number of authentication ports in synchronization with each other, for example, one-time-password techniques may be used.

As described above, in the fifth modification, the security of the server 13 can be improved much more by changing the order of access to the n number of authentication ports each time the communications port is accessed in such a manner that the server 13 and the client terminal 11a are in synchronization with each other.

[Sixth Modification]

Figure 14:
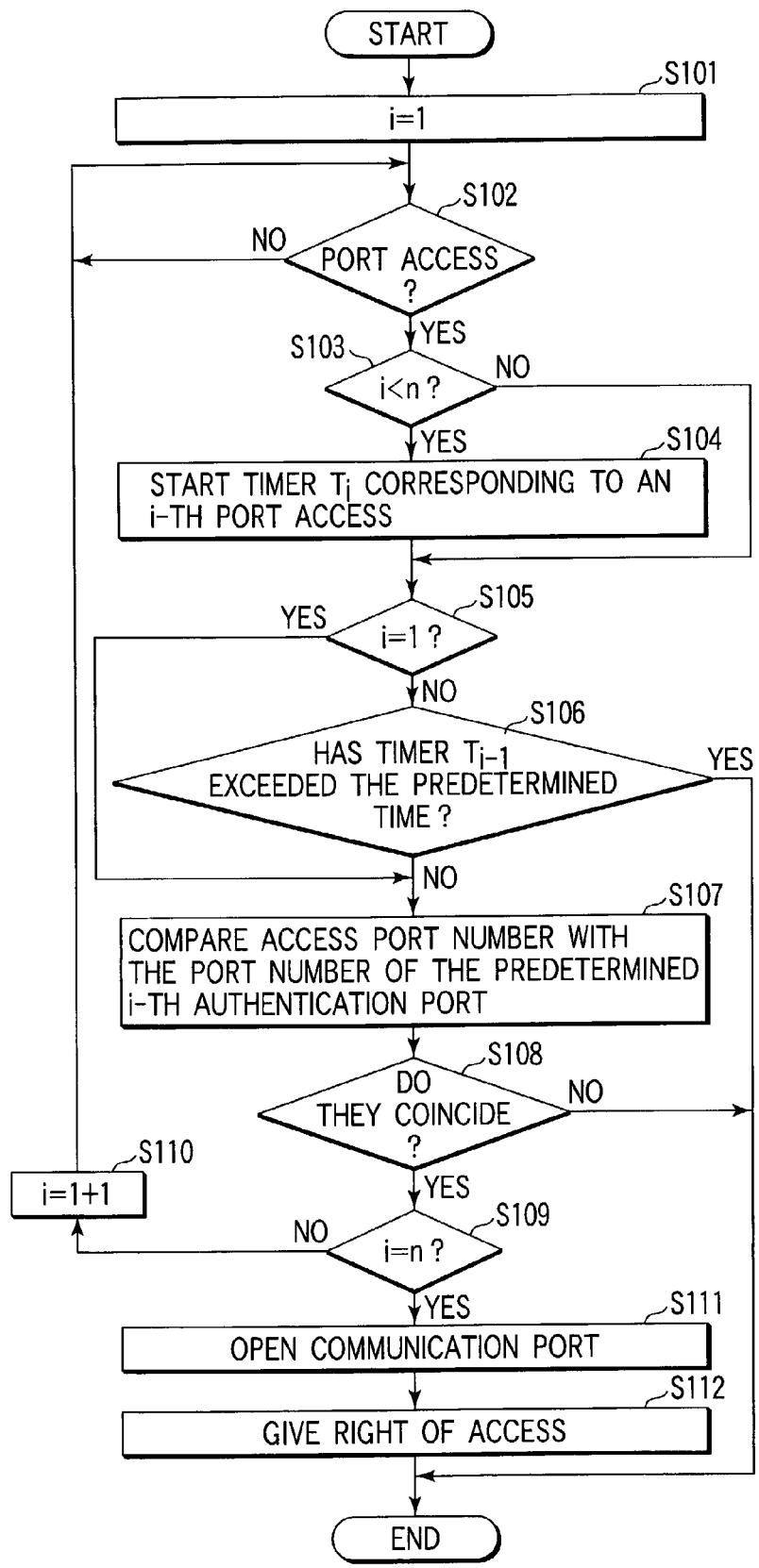
FIG. 14 is a flowchart to help explain the procedure for the processing by the server 13 in a sixth modification of the first embodiment.

Next, a sixth modification of the first embodiment will be explained by reference to a flowchart in FIG. 14. FIG. 14 is a flowchart to help explain the procedure for the processing by the server 13.

The sixth modification is characterized in that not only the port numbers of the n number of authentication ports but also the upper limit of the time interval between port accesses (access time interval) in accessing each of the n number of authentication ports are previously determined. Information about the upper limit of the access time interval, that is, the allowable access time interval, has been stored in the access time area 139 of the storage unit 136 the server 13 has. Like the port numbers of the n number of authentication ports, the access time interval is notified to (the authorized user of) the client terminal 11a in such a manner that it is kept secret from a third party.

It is assumed that the port numbers 5000 to 5002 of three ports P2 to P4 are notified (or set) as the port numbers for authentication ports and that information about the access time interval is also notified (or set). In this modification, the access time interval between access to port P2 and access to port P3 is T1 (e.g., 100 msec) and the access time interval between access to port P3 and access to port P4 is T2 (e.g., 1 sec).

When the client terminal 11a needs to access the server 13, the terminal 11a performs access to port P2 with the port number 5000, access to port P3 with the port number 5001, and access to port P4 with the port number 5002 in such a manner that each access time interval lies in a predetermined time. In the modification, the ports are accessed sequentially in such a manner that the time interval between access to port P2 and access to port P3 is less than T1 and the time interval between access to port P3 and access to port P4 is less than T2.

On the other hand, when the client terminal 11a performs an i-th (where i<n) authentication port access, (the port number manager 134 in) the server 13 starts a timer T1 that counts a corresponding access time interval (steps S102 to S104). If i≠1, that is, if the access is not the first authentication port access, the server 13 determines whether the timer started when the preceding (i−1)-th authentication port access was performed has exceeded the predetermined time (steps S105, S106). The timer is a timer Ti−1 that counts an access time interval of Ti−1.

If the timer Ti−1 has exceeded the predetermined time, the server 13 determines that the time interval between the (i−1)-th authentication port access and the i-th authentication port access does not lie in the predetermined access time interval Ti−1 and therefore the server 13 is unable to authenticate. In this case, the server 13 does not open communications port P1, regardless of whether the i-th authentication port access was performed in the right order of access.

In contrast, when each time interval at which the n number of authentication ports (or authentication ports P2 to P4) are accessed is less than the predetermined access time intervals (T1, T2) and the n number of authentication ports are accessed in a predetermined order (steps S101 to S110), the server 13 determines that it has been able to authenticate. In this case, the server 13 opens communications port P1 and gives a right of access to the terminal 11a (steps S111 and S112).

In the sixth modification of the first embodiment, the security of the server 13 can be improved much more by preventing the communications port from being opened unless each time interval at which the n number of authentication ports are accessed is less than the corresponding time interval when they are accessed in sequence. While in the sixth modification, the order of access is also included in the authentication conditions, only the access time interval may be included in the authentication conditions.

At least two of the first to sixth modifications may be combined. For instance, if an n number of authentication ports are not accessed in a specific order of access within a specific time, communications port P1 may not be opened. Furthermore, the password may be authenticated when the communications port P1 is opened as a result of the n number of authentication ports being accessed in a specific order of access.

[Second Embodiment]

Figure 15:
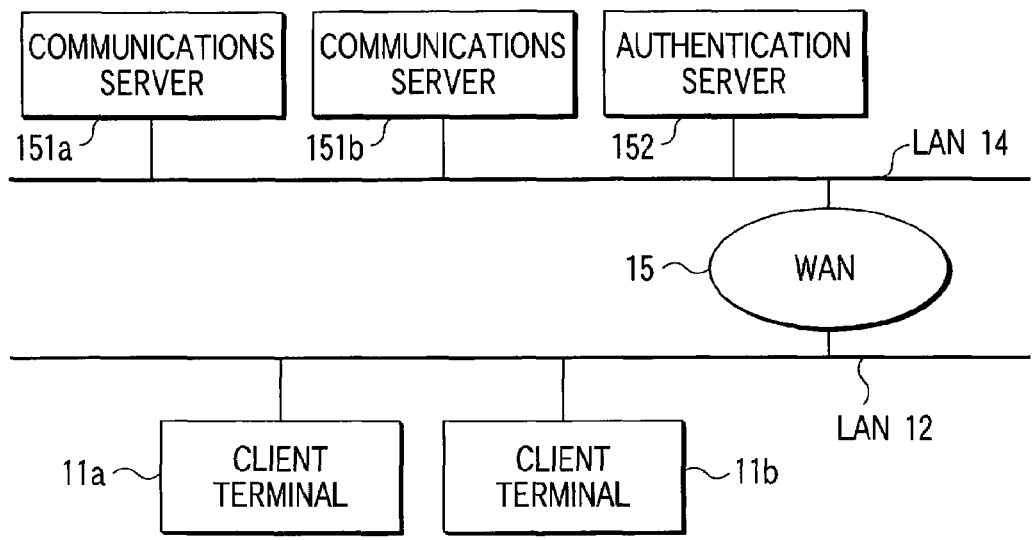
FIG. 15 shows the configuration of a communications system according to a second embodiment of the present invention.

FIG. 15 shows the configuration of a communications system according to a second embodiment of the present invention. In FIG. 15, the same parts as those in FIG. 1 are indicated by the same reference numerals.

The system of FIG. 15 is characterized by having two types of servers (or server computers), a communications server and an authentication server, and carrying out processes in such a manner that the communications server executes a communication process via a communications port and the authentication server executes an authentication process on the basis of port access. In the second embodiment, it is assumed that a plurality of communications servers, for example, two communications servers 151a and 151b, and a single authentication server 152 are connected to a LAN 14. The authentication server 152 has the same configuration as that of the server 13 shown in FIG. 2.

Figure 16:
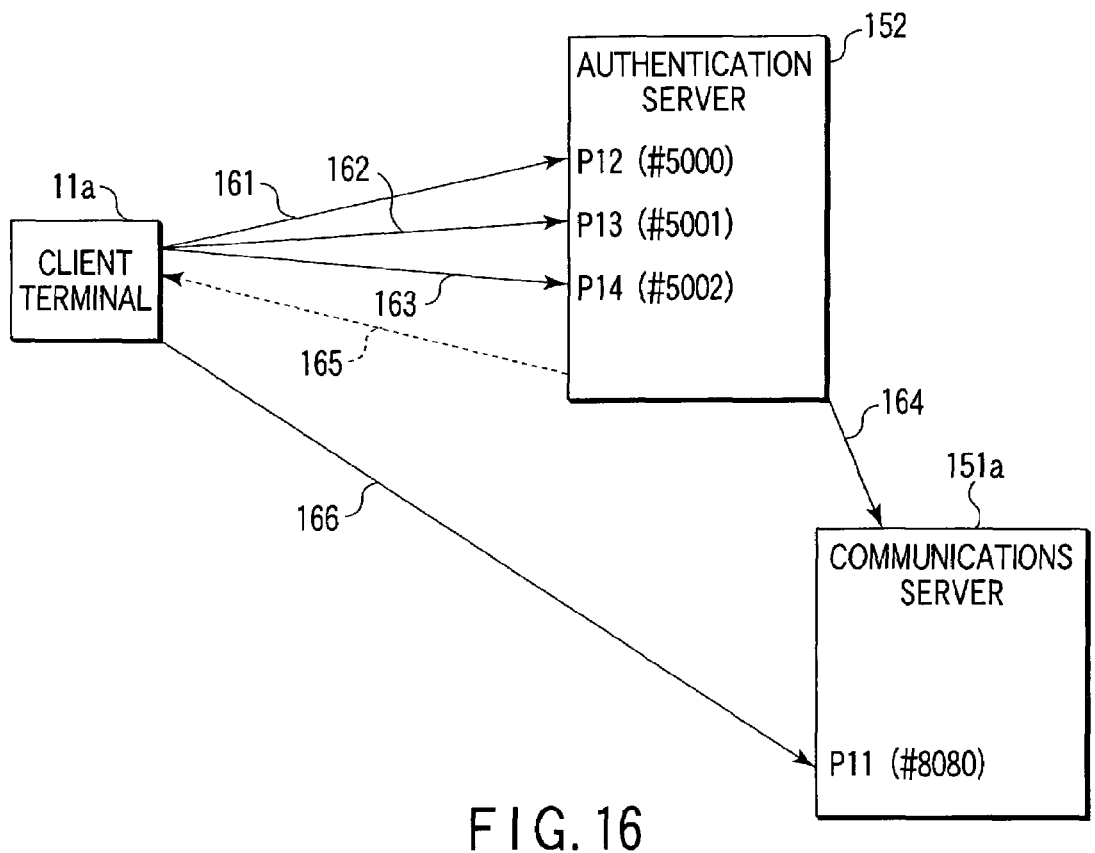

In the communications server 151a, port P11 with the port number 8080 is allocated as a communications port in advance as shown in an explanatory diagram of FIG. 16. The same holds true for the communications server 151b. On the other hand, in the authentication server 152, ports P12, P13, and P14 with the port numbers 5000, 5001, and 5002 are previously allocated as authentication ports as shown in FIG. 16. It is assumed that the address (or server address) of the communications server 151a and the port number 8080 of communications port P11 are set in the client terminals 11a and 11b in advance. Furthermore, the address (or server address) of the authentication server 152 and the port numbers 5000, 5001, and 5002 of authentication ports P12, P13, and P14 are previously set in the client terminals 11a and 11b.

Figure 17:
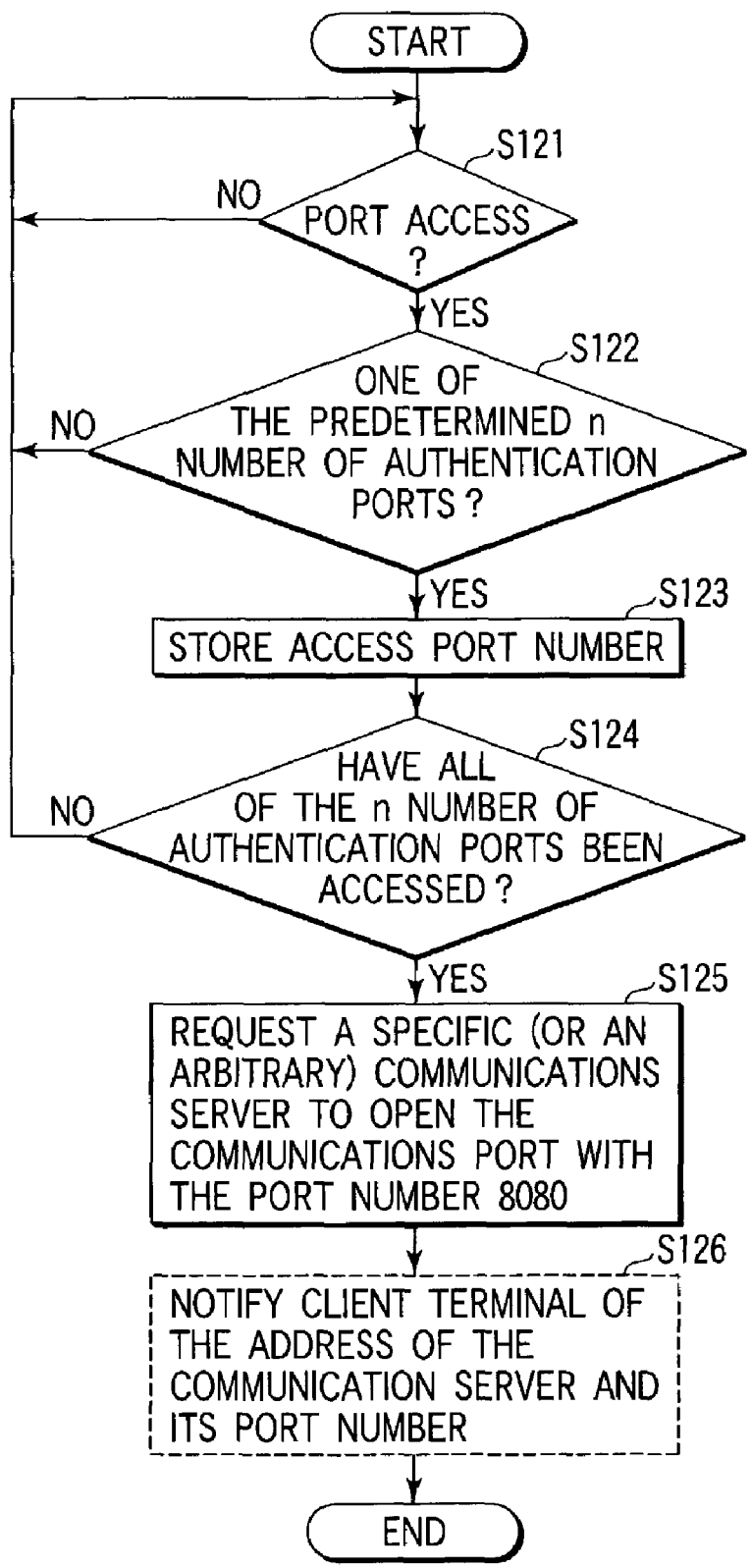
FIG. 17 is a flowchart to help explain the procedure for the processing by the authentication server 152 in the second embodiment.

Next, the operation of the second embodiment will be explained by reference to not only the explanatory diagram of FIG. 16 but also a flowchart in FIG. 17, using a case where the client terminal 11a accesses the communications server 151a. FIG. 17 is a flowchart to help explain the procedure of the processing by the authentication server 152.

When the client terminal 11a needs to access the communications server 151a at the request of the user of the client terminal 11a, the terminal 11a accesses one of a predetermined n number of authentication ports of the authentication server 152, that is, one of authentication ports P12 to P14 with the port numbers 5000 to 5002. At this time, communications port P11 of the communications server 151a has been closed. When the port is accessed by the client terminal 11a (step S121), the authentication server 152 determines whether the port is one of the n (=3) number of authentication ports (P12 to P14) indicated by the predetermined port number (step S122).

If the accessed port is not one of the n (=3) number of authentication ports (P12 to P14), the authentication server 152 waits for the next port access (step S121). In contrast, if the accessed port is one of the n (=3) number of authentication ports (P12 to P14), the authentication server 152 stores the port number of the accessed authentication port (step S123). Then, the authentication server 152 determines from the port numbers of all of the authentication ports stored at that time whether all of the n (=3) number of authentication ports (P12 to P14) have been accessed (step S124). If there is any unaccessed authentication port left, the authentication server 152 waits for the next port access (step S121).

When accessing one of the n (=3) number of authentication ports (P12 to P14), the client terminal 11a determines whether it has accessed all of the authentication ports. If there is any unaccessed authentication port left, the client terminal 11a accesses one of the remaining unaccessed authentication ports.

On the other hand, when the client terminal 11a has accessed all of the n (=3) number of authentication ports (P12 to P14) (step S124), the authentication server 152 determines that it has been able to authenticate. In the second embodiment, as shown in FIG. 16, when the client terminal 11a performs port access 161 to port P12 with the port number 5000, port access 162 to port P13 with the port number 5001, and port access 163 to port P14 with the port number 5002, the authentication server 152 determines that it has been able to authenticate. In this case, the authentication server 152 issues an open request 164 to open communications port P11 with the port number 8080 to a specific communications server, for example, the communications server 151a (step S125). In response to the open request 164 from the authentication server 152, the communications server 151a opens communications port P11. As a result, the client terminal 11a performs access 166 to the communications server 151a via the opened communications port P11 and thereby can use various resources of the server 151a.

As the port authentication conditions, it is possible to add not only the condition of accessing ports P12 to P14 with the port numbers 5000 to 5002 in the authentication server 152 but also the same authentication condition as in the modifications of the first embodiment. For instance, the condition of accessing the authentication ports P12 to P14 within a specific time or the condition of accessing authentication ports P12 to P14 in a specific order (e.g., in this order: P12→P13→P14) may be added.

In the second embodiment, the address of the communications server 151a and the port number 8080 of communications port P11 are previously set in the client terminal 11a to allow the terminal 11a to use the communications server 151a. However, only the address of the authentication server 152 and the port numbers 5000 to 5002 of authentication ports P12 to P14 may be set in the client terminal 11a and the address of the communications server 151a and the port number of communications port P11 may not be set. In this case, the authentication server 152, in step S125, selects one of the communications servers 151a and 151b, for example, the communications server 151a, and issues an open request 164 to open communications port P11 with the port number 8080 to the selected communications server 151a. In addition, the authentication server 152 executes step S126, thereby carrying out the process of notifying the address of the selected communications server 151a and the port number 8080 of communications port P11 to the client terminal 11a. On the basis of the server address and port number notified by the authentication server 152, the client terminal 11a can communicate with the communications server 151a specified by the address via communications port P11 with the notified port number.

Figure 18:
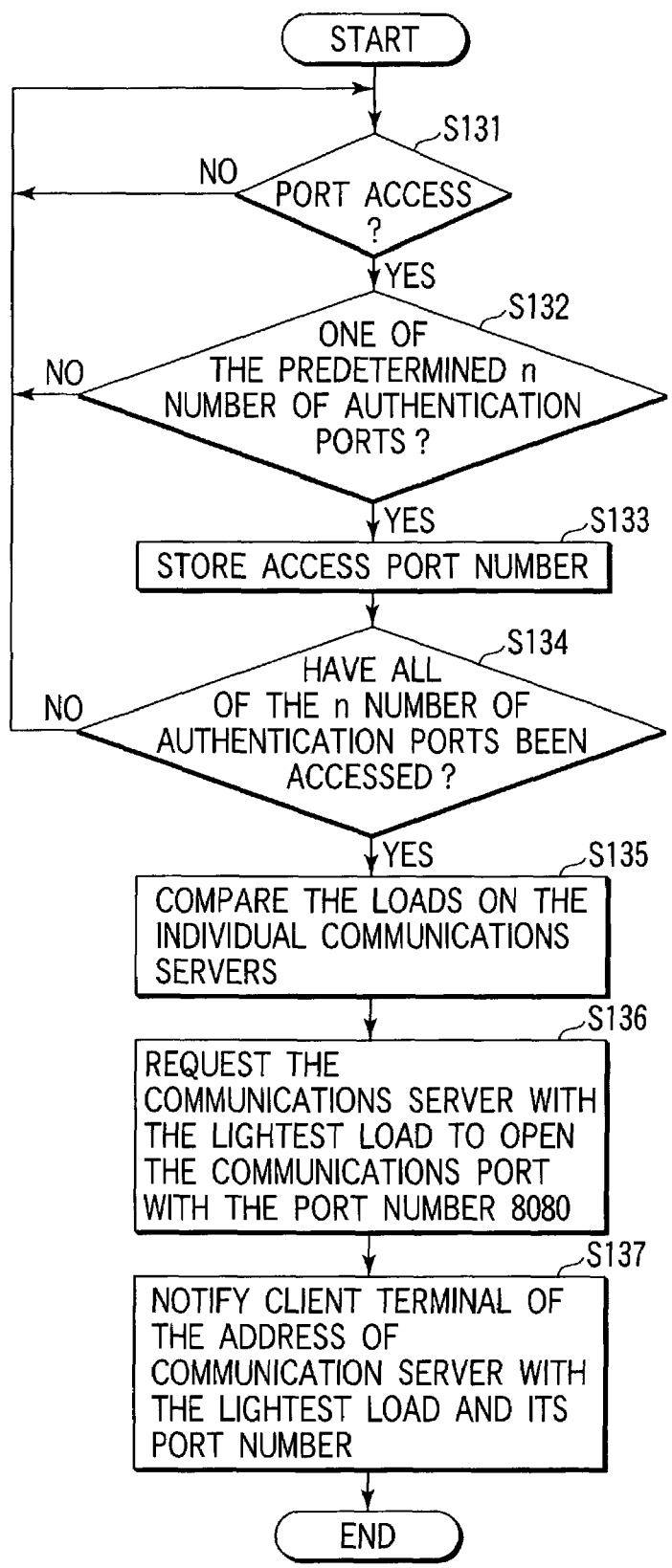
FIG. 18 is a flowchart to help explain the procedure for the processing by the authentication server 152 in a modification of the second embodiment.

To select one of the communications servers 151a and 151b, the algorithm of examining the loads on the communications servers 151a and 151b and selecting the communications server with the lightest load is used to. FIG. 18 shows a flowchart using this algorithm.

In the second embodiment, the authentication server 152 carries out a port authenticating process for the client terminal 11a in step S131 to step S134 corresponding to step S121 to step S134 of FIG. 17. If the authentication server 152 has determined from the result of the port authenticating process that it has been able to authenticate, the server 152 compares the load on the communications server 151a with that on the communications server 151b (step S135). On the basis of the result of the comparison, the authentication server 152 selects the communications server with the lightest load and requests the selected communications server to open communications port P11 with the port number 8080 (step S136). At the same time, the authentication server 152 informs the client terminal 11a of the address of the selected communications server and the port number 8080 of communications port P11 (step S137). This enables the client terminal 11a to communicate with whichever of the communications servers 151a and 151b has the lightest load at that time. As a result, it is possible to equalize the loads on the group of communications servers. The loads on the communications servers 151a and 151b are measured by the authentication server 152 communicating with the communications servers 151a and 151b periodically. The measured loads are held until they are measured next time.

[Third Embodiment]

FIG. 19 shows the configuration of a communications system according to a third embodiment of the present invention. In FIG. 19, the same parts as those in FIG. 1 are indicated by the same reference numerals.

A first characteristic of the system of FIG. 19 is that it has three types of servers (or server computers): a communications server, authentication servers, and a management server. A second characteristic of the system is that each of the plurality of authentication servers carries out an authentication process on the basis of port access and, on the basis of the result of the authenticating process, the management server carries out a comprehensive authentication process. In the third embodiment, it is assumed that a communications server 191, a plurality of (for example, three) authentication servers 192a to 192c, and a management server 193 are connected to the LAN 14. Each of the authentication servers 192a to 192c has the same configuration as that of the server 13 shown in FIG. 2.

In the communications server 191, port P21 with the port number 8080 is previously allocated as a communications port in advance as shown in an explanatory diagram of FIG. 20. On the other hand, in the authentication servers 192a to 192c, ports P22 to P24 with the port numbers 5000 to 5002 are allocated as authentication ports in advance as shown in FIG. 20. It is assumed that the address (or server address) of the communications server 191, the port number 8080 of communications port P21, the addresses (or server addresses) of the authentication servers 192a to 192c, and the port numbers 5000 to 5002 of authentication ports P22 to P24 of the authentication servers 192a to 192c are set in the client terminals 11a and 11b in advance.

The operation of the third embodiment will be explained by reference to FIG. 20, using the case in which the client terminal 11a accesses the communications server 191. First, when the client terminal 11a needs to access the communications server 191 at the request of the user of the client terminal 11a, the terminal 11a performs port access 201 to authentication port P22 with the predetermined port number 5000 of one of the authentication servers 192a to 192c, for example, the authentication server 192a. Then, the client terminal 11a performs port access 202 to authentication port P23 with the predetermined port number 5001 of one of the unaccessed authentication servers 192b and 192c, for example, the authentication server 192b. Next, the client terminal 11a performs port access 203 to authentication port P24 with the predetermined port number 5002 of the unaccessed authentication server 192c.

When the authentication servers 192a to 192c detect that authentication ports P22 to P24 with the predetermined numbers 5000 to 5002 have been accessed by the client terminal 11a, each of them determines that it has been able to authenticate. In this case, the authentication servers 192a to 192c send notices of successful authentication 204 to 206 to the management server 193.

After receiving all of the notices of successful authentication 204 to 206 from the authentication servers 192a to 192c, the management server 193 determines comprehensively that it has succeeded in authenticating the client terminal 11a. In this case, the management server 193 issues to the communications server 191 an open request 207 to open communications port P21 with the port number 8080. This enables the client terminal 11a to perform access 208 to the communications server 191 via the opened communications port P21 and then be able to use various resources of the server 191.

As described above, with the third embodiment, since the authenticating process (or the port authenticating process) making use of port access from the client terminal 11a is shared by the authentication servers 192a to 192c and the management server 193, the loads on the servers are distributed. The communications server 191 may be provided with the function of the management server 193. As the port authenticating condition, not only the condition of accessing ports P22 to P24 with the port numbers 5000 to 5002 of the authentication servers 192a to 192c but also the same authentication condition as in the modifications of the first embodiment may be added. For example, the condition of accessing authentication ports P22 to P24 within a specific time or the condition of accessing authentication ports P22 to P24 in a specific order (e.g., in this order: P22→P23→P24) may be added. Whether the authenticating condition has been met is determined by the management server 193 on the basis of, for example, the timing with which the notices of successful authentication 204 to 206 are given by the authentication servers 192a to 192c.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. In a communications system comprising a server that includes a port allocated as a communications port and a plurality of ports allocated as authentication ports not known to a third party, a method of authenticating a client terminal by making use of port access to said server from said client terminal, said client terminal being connected to said server via a network, said method comprising:

monitoring the accessing by said client terminal to any one of said plurality of authentication ports;

detecting on the basis of the result of the monitoring of said accessing that all of said plurality of authentication ports have been accessed by said client terminal; and opening said communications port to said client terminal, when it is detected that all of said plurality of authentication ports have been accessed by said client terminal and all of said plurality of authentication ports have successfully authenticated said client terminal.

2. A method according to claim 1, further comprising detecting that the order in which said plurality of authentication ports are accessed coincides with a predetermined order, wherein all of said plurality of authentication ports have successfully authenticated said client terminal when all of said plurality of authentication ports have been accessed by said client terminal and the order in which they have been accessed coincides with said predetermined order.

3. A method according to claim 1, further comprising:
measuring the access time required for all of said plurality of authentication ports to be accessed by said client terminal; and
detecting that said measured access time is within a predetermined time, wherein
all of said plurality of authentication ports have successfully authenticated said client terminal when all of said plurality of authentication ports are accessed by said client terminal within said predetermined time.

4. A method according to claim 1, further comprising:
performing authentication by a password via the communications port after said communications port is opened; and
giving said client terminal a right of access to said server, when said authentication by a password is successful.

5. A method according to claim 1, further comprising changing the number of said authentication ports and the port numbers of them each time said communications port is opened.

6. A method according to claim 1, further comprising changing said predetermined order of access each time said communications port is opened.

7. A method according to claim 1, further comprising:
measuring the time interval between accesses to said plurality of authentication ports; and
detecting that said measured access time interval is within a predetermined time interval, wherein
all of said plurality of authentication ports have successfully authenticated said client terminal when all of said plurality of authentication ports are accessed by said client terminal and each time interval between accesses to said plurality of authentication ports is within said predetermined time interval.

8. In a communications system comprising at least one communications server that includes a port allocated as a communications port and an authentication server that includes a plurality of ports allocated as authentication ports not known to a third party, a method of authenticating a client terminal by making use of port access to said authentication server from said terminal, said client terminal, said at least one communications server, and said authentication server being connected via a network, said method comprising:
monitoring the accessing by said client terminal to any one of said plurality of authentication ports of said authentication server;
detecting on the basis of the result of the monitoring of said accessing that all of said plurality of authentication ports of said authentication server have been accessed by said client terminal; and
causing said authentication server to request said communications server to open said communications port of said communications server to said terminal, when it is detected that all of said plurality of authentication ports of said authentication server have been accessed by said client terminal all of said plurality of authentication ports have successfully authenticated said client terminal.

9. A method according to claim 8, further comprising notifying said terminal of the address of said communications server and the port number of said communications port when said authentication server requests said communications server to open said communications port to said client terminal.

10. A method according to claim 8, wherein
said communications system has a plurality of communications servers one of which is said at least one communications server and each of which has a port allocated as said communications port, and
the method further comprises selecting any one of said plurality of communications servers as a communications server whose communications port is to be opened and with which said client terminal can communicate, when it is detected that all of said plurality of authentication ports of said authentication server have been accessed by said client terminal all of said plurality of authentication ports have successfully authenticated said client terminal.

11. A method according to claim 10, further comprising measuring the loads on said plurality of communications servers, wherein a communications server having the lightest load is selected, when loads on said plurality of communications servers are measured.

12. In a communications system comprising a communications server that includes a port allocated as a communications port, a plurality of authentication servers that includes at least one port allocated as an authentication port not known by a third party, and a management server, a method of authenticating a client terminal by making use of port access to said plurality of authentication servers from said terminal, said client terminal, said communications server, said plurality of authentication servers, and said management server being connected via a network, said method comprising:
detecting the accessing of said client terminal to the authentication ports of said plurality of authentication servers for each of said plurality of authentication servers;
causing said authentication server to notify said management server of success in authentication, when the accessing of said client terminal to said authentication port of said authentication server is detected; and
causing said management server to request said communications server to open said communications port of said communications server to said client terminal, when all of said plurality of authentication servers notify said management server of success in authentication all of said plurality of authentication ports have successfully authenticated said client terminal.

13. An article of manufacture comprising a computer-usable medium having computer-readable program code means embodied therein, the computer-readable program code means in said article of manufacture comprising:
computer-readable program code means for causing a server computer to monitor the accessing of a client terminal to any one of a plurality of authentication ports of the server computer, the server computer including a port allocated as a communications port and the plurality of ports allocated as authentication ports not known by a third party, and said terminal being connected to the server computer via a network;
computer-readable program code means for causing said server computer to detect on the basis of the result of the monitoring of said accessing that all of said plurality of authentication ports have been accessed by said client terminal; and
computer-readable program code means for causing said server computer to open said communications port to said client terminal, when it is detected that all of said plurality of authentication ports have been accessed by said client terminal all of said plurality of authentication ports have successfully authenticated said client terminal.

14. A server which includes a port allocated as a communications port and a plurality of ports allocated as authentication ports not known by a third party and which authenticates a client terminal connected to the server via a network by making use of port access from said terminal, said server comprising:

means for monitoring the accessing by said client terminal to any one of said plurality of authentication ports;

means for detecting that all of said plurality of authentication ports have been accessed by said client terminal, on the basis of the result of the monitoring of said accessing; and means for opening said communications port to said client terminal, when said detecting means detects that all of said plurality of authentication ports have been accessed by said client terminal all of said plurality of authentication ports have successfully authenticated said client terminal.

* * * * *